(12) United States Patent
Guo et al.

(10) Patent No.: US 11,732,789 B2
(45) Date of Patent: Aug. 22, 2023

(54) ASSEMBLY FOR USE IN AN ELECTRIC VEHICLE

(71) Applicant: BorgWarner Inc., Auburn Hills, MI (US)

(72) Inventors: Chengyun Guo, Novi, MI (US); Keith Van Maanen, Bloomfield Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/460,822

(22) Filed: Aug. 30, 2021

(65) Prior Publication Data

US 2023/0068411 A1 Mar. 2, 2023

(51) Int. Cl.
*F16H 37/08* (2006.01)
*B60K 1/00* (2006.01)
*B60K 17/08* (2006.01)
*B60K 1/02* (2006.01)

(52) U.S. Cl.
CPC ............. *F16H 37/082* (2013.01); *B60K 1/00* (2013.01); *B60K 1/02* (2013.01); *B60K 17/08* (2013.01); *F16H 37/0806* (2013.01); *B60K 2001/001* (2013.01); *F16H 2200/0021* (2013.01);
(Continued)

(58) Field of Classification Search
CPC ........ F16H 37/082; F16H 3/091; F16H 3/093; B60K 1/00
See application file for complete search history.

(56) References Cited

U.S. PATENT DOCUMENTS 8,992,366 B2 * 3/2015 Gassmann ............... B60K 1/00 475/221
10,174,828 B2 1/2019 Keller et al.
10,920,859 B2 2/2021 Conlon et al.
(Continued)

FOREIGN PATENT DOCUMENTS

DE 102018116319 A1 1/2020
WO 2019120803 A1 6/2019

OTHER PUBLICATIONS

Machine-Assisted English translation for DE 10 2018 116 319 A1 extracted from the espacenet.com database on Sep. 13, 2021, 16 pages.
(Continued)

*Primary Examiner* — Derek D Knight
(74) *Attorney, Agent, or Firm* — Howard & Howard Attorneys PLLC

(57) ABSTRACT

An assembly for an electric vehicle includes an input shaft extending along a first axis and an electric motor rotatably coupled to the input shaft and co-axially aligned with the first axis. The assembly also includes an intermediate input shaft extending along a second axis and rotatably coupled to the input shaft. The assembly also includes an output shaft extending along the second axis and spaced from the intermediate input shaft along the second axis. The assembly further includes a planetary gearset rotatably coupled to the intermediate input shaft and to the output shaft, and co-axially aligned with the second axis. The assembly includes a final drive co-axially aligned with the first axis and rotatably coupled to the output shaft for providing rotational torque to at least one of a first and second set of wheels of the electric vehicle.

21 Claims, 13 Drawing Sheets

(52) U.S. Cl.
CPC ........... *F16H 2200/0034* (2013.01); *F16H 2200/2005* (2013.01); *F16H 2200/2007* (2013.01)

(56) References Cited

U.S. PATENT DOCUMENTS

| | | | |
|---|---|---|---|
| 11,339,854 B2* | 5/2022 | Schlager | B60K 17/04 |
| 2020/0256465 A1* | 8/2020 | Gassmann | F16H 63/3026 |
| 2021/0164193 A1 | 6/2021 | Bebeti et al. | |

OTHER PUBLICATIONS

English language abstract for WO 2019/120803 A1 extracted from espacenet.com database on Sep. 13, 2021, 1 page.

\* cited by examiner

ASSEMBLY FOR USE IN AN ELECTRIC VEHICLE

BACKGROUND OF THE INVENTION

1. Field of the Invention

The present invention generally relates to an assembly for use in an electric vehicle including a first and second set of wheels.

2. Description of the Related Art

Conventional assemblies in the art for use in an electric vehicle typically include an input shaft extending along a first axis and rotatably coupled to an electric motor. The electric motor is typically co-axially aligned with the first axis and provides rotational torque to the input shaft. The input shaft of convention assemblies is rotatably coupled to an output shaft, with the output shaft receiving rotational torque from the input shaft provided to the input shaft from the electric motor.

Electric vehicles known in the art include first and second sets for wheels. Conventional assemblies for electric vehicles include a final drive, such as a differential, rotatably coupled to the output shaft. The final drives known in the art are configured to receive rotational torque from the output shaft and provide rotational torque to at least one of the first and second set of wheels of the electric vehicle.

In recent years, there has been a desire for electric vehicles to have improved performance. Particularly, there has been a desire for electric vehicles to have improved electric powertrains to provide rotational torque from the electric motor to one of the first and second sets of wheels of the electric vehicle. However, typical electric powertrains have been able to provide only a limited range of rotational torque to one of the first and second wheels of the electric vehicle, largely dependent upon the design of the electric motor itself. Moreover, typical electric powertrains occupy a considerable amount of space in a chassis of the electric vehicle, which typically results in increased cost, weight, and components of the electric powertrain.

As such, there remains a need to provide an improved assembly for an electric vehicle.

SUMMARY OF THE INVENTION AND ADVANTAGES

An assembly for an electric vehicle, with the electric vehicle including a first and second set of wheels, includes an input shaft extending along a first axis and an electric motor rotatably coupled to the input shaft. The electric motor is co-axially aligned with the first axis and is configured to provide rotational torque to the input shaft. The assembly also includes an intermediate input shaft extending along a second axis different from the first axis, and the intermediate input shaft is rotatably coupled to the input shaft. The intermediate input shaft is configured to receive rotational torque from the input shaft.

The assembly also includes an output shaft extending along the second axis, with the output shaft spaced from the intermediate input shaft along the second axis. The assembly further includes a planetary gearset rotatably coupled to the intermediate input shaft and to the output shaft. The planetary gearset is co-axially aligned with the second axis and is configured to transmit rotational torque from the intermediate input shaft to the output shaft. Moreover, the assembly includes a final drive co-axially aligned with the first axis. The final drive is rotatably coupled to the output shaft for providing rotational torque to at least one of the first and second set of wheels of the electric vehicle.

Accordingly, having the final drive co-axially aligned with the first axis reduces the packaging space of the assembly in the electric vehicle. Further, having the planetary gearset rotatably coupled to the intermediate input shaft and to the output shaft, co-axially aligned with the second axis, and configured to transmit rotational torque from the intermediate input shaft to the output shaft allows the assembly to provide a wider range of rotational torque to one of the first and second wheels of the electric vehicle without being dependent upon the design of the electric motor.

In another embodiment, an assembly for an electric vehicle, with electric vehicle including a first and second set of wheels, includes an input shaft extending along a first axis and an electric motor rotatably coupled to the input shaft. The electric motor is also co-axially aligned with the first axis and is configured to provide rotational torque to the input shaft. The assembly also includes an intermediate input shaft extending along a second axis different from the first axis, and the intermediate input shaft is rotatably coupled to the input shaft. The intermediate input shaft is also configured to receive rotational torque from the input shaft.

The assembly also includes an output shaft extending along the second axis, with the output shaft spaced from the intermediate input shaft along the second axis. The assembly for the electric vehicle includes a transfer shaft rotatably coupled to the intermediate input shaft and the output shaft. The transfer shaft extends along a third axis different from the first axis and the second axis. The transfer shaft is configured to transmit rotational torque from the intermediate input shaft to the output shaft. Moreover, the assembly also includes a final drive co-axially aligned with the first axis. The final drive is also rotatably coupled to the output shaft for providing rotational torque to at least one of the first and second set of wheels of the electric vehicle.

Accordingly, having the final drive co-axially aligned with the first axis reduces the packaging space of the assembly in the electric vehicle. Further, having the transfer shaft rotatably coupled to the intermediate input shaft and the output shaft, extending along a third axis, and configured to transmit rotational torque from the intermediate input shaft to the output shaft allows the assembly to provide a wider range of rotational torque to one of the first and second wheels of the electric vehicle without being dependent upon the design of the electric motor.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 12:
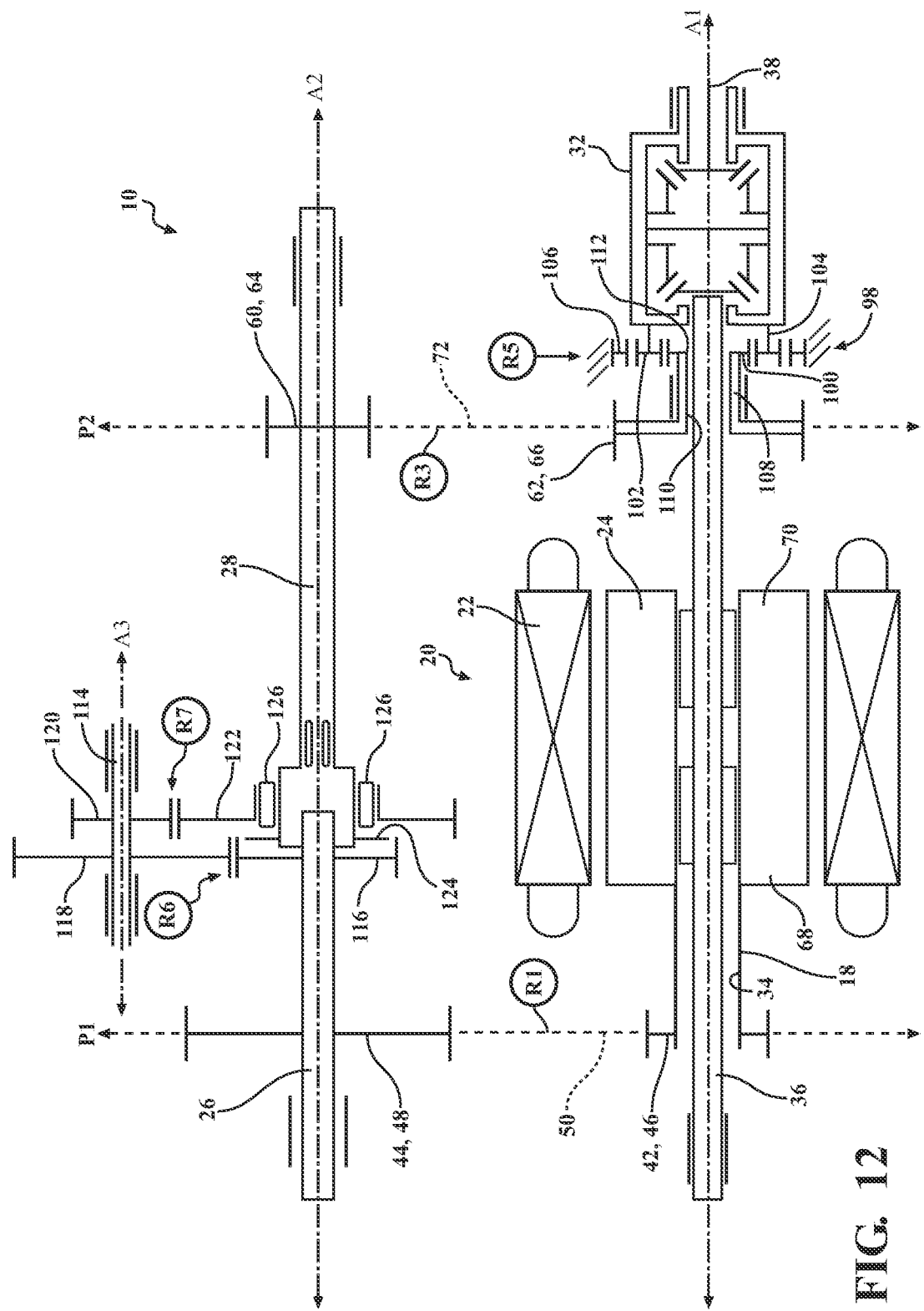
FIG. 12 is a schematic illustration of another embodiment of the assembly, with the assembly including the transfer shaft and including a third planetary gearset rotatably coupled to the final drive.
Figure 13:
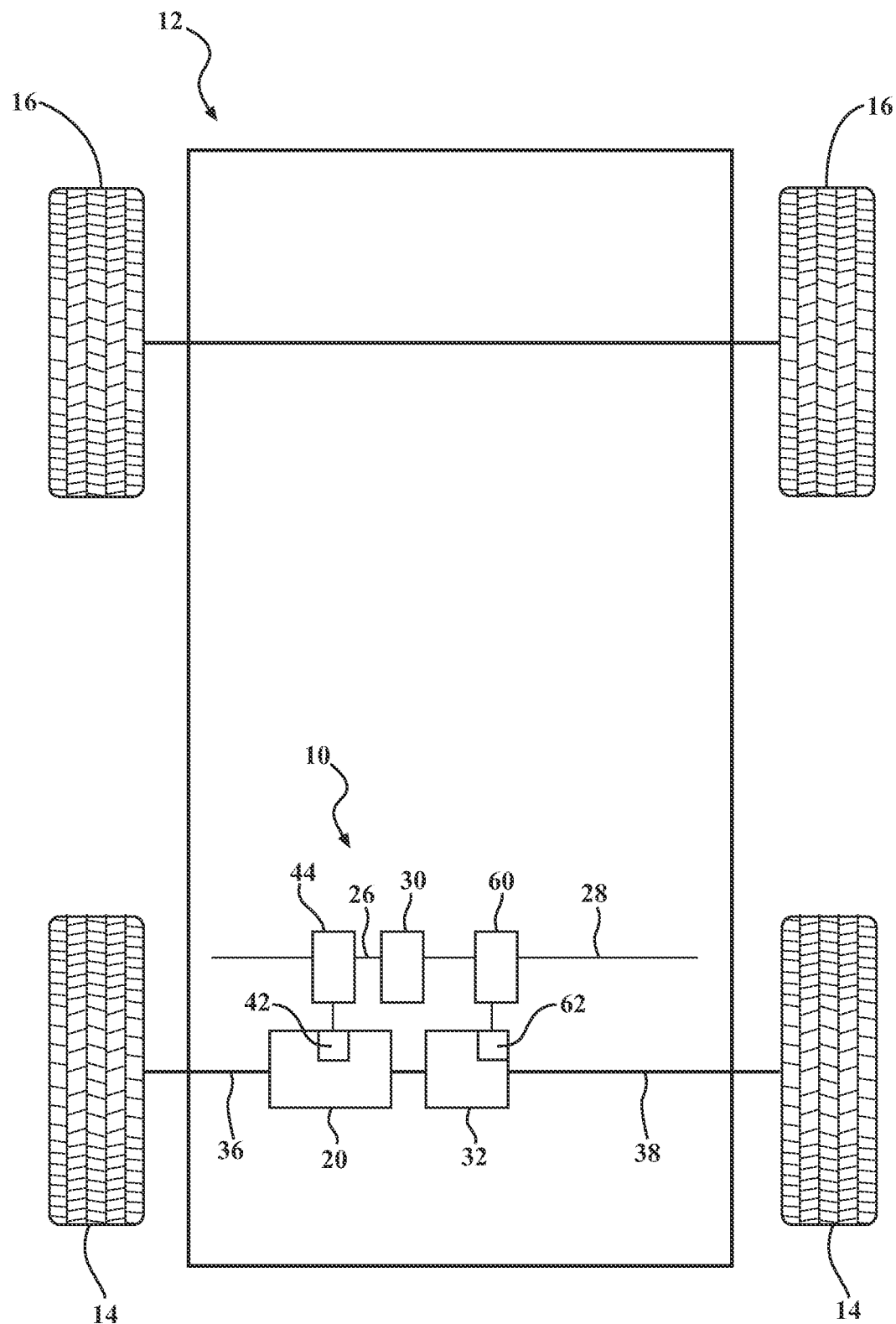
FIG. 13 is a schematic illustration of the assembly in the electric vehicle including first and second sets of wheels.

With reference to the Figures, wherein like numerals indicate like parts throughout the several views, an assembly 10 is provided for an electric vehicle 12 including a first and second set of wheels 14, 16, as shown in FIG. 13. With reference to FIGS. 1-12, the assembly 10 includes an input shaft 18 extending along a first axis A1 and an electric motor 20 rotatably coupled to the input shaft 18. The electric motor 20 typically includes a stator 22 and a rotor 24 that rotates relative to the stator 22. The electric motor 20 is co-axially aligned with the first axis A1 and is configured to provide rotational torque to the input shaft 18. The assembly 10 also includes an intermediate input shaft 26 extending along a second axis A2 different from the first axis A1 and is rotatably coupled to the input shaft 18. The intermediate input shaft 26 is configured to receive rotational torque from the input shaft 18.

The assembly 10 also includes an output shaft 28 extending along the second axis A2, with the output shaft 28 spaced from the intermediate input shaft 26 along the second axis A2. The intermediate input shaft 26 and the output shaft 28 may be co-axially aligned with one another with respect to the second axis A2. In the embodiment shown in FIGS. 1-6, the assembly 10 further includes a planetary gearset 30 rotatably coupled to the intermediate input shaft 26 and to the output shaft 28. The planetary gearset 30 is co-axially aligned with the second axis A2 and is configured to transmit rotational torque from the intermediate input shaft 26 to the output shaft 28. Moreover, the assembly 10 includes a final drive 32 co-axially aligned with the first axis A1. The final drive 32 is rotatably coupled to the output shaft 28 for providing rotational torque to at least one of the first and second set of wheels 14, 16 of the electric vehicle 12.

Accordingly, having the final drive 32 co-axially aligned with the first axis A1, along which the input shaft 18 extends and at which the electric motor 20 is co-axially aligned, reduces the packaging space of the assembly 10 in the electric vehicle 12. Further, having the planetary gearset 30 rotatably coupled to the intermediate input shaft 26 and to the output shaft 28, co-axially aligned with the second axis A2, and configured to transmit rotational torque from the intermediate input shaft 26 to the output shaft 28 allows the assembly 10 to provide a wider range of rotational torque to one of the first and second wheels 14, 16 of the electric vehicle 12 without being dependent upon the design of the electric motor 20.

The electric motor 20 may be configured to provide rotational torque directly to the input shaft 18. Said differently, there may be no intervening components between the electric motor 20 and the input shaft 18. The rotor 24 of the electric motor 20 may be rotatably coupled to the input shaft 18 to provide rotational torque to the input shaft 18. Alternatively, it is to be appreciated that the electric motor 20 may be configured to provide rotational torque indirectly to the input shaft 18. In a non-limiting example, the electric motor 20 may provide rotational torque to the input shaft 18 through intervening components such as, but not limited to, an intervening shaft, an intervening planetary gearset, an intervening gear, and/or an intervening flexible drive such as an intervening chain.

Although not required, input shaft 18 may be hollow. In other words, the input shaft 18 may define a first bore 34 extending through the input shaft 18 along the first axis A1. The assembly 10 may further include a first axle shaft 36 extending from the final drive 32 toward one wheel of one of the set of wheels 14, and a second axle shaft 38 extending from the final drive 32 toward the other wheel of one of the set of wheels 14. It is to be appreciated that the first and second axle shafts 36, 38 may extend toward either the front wheels of the electric vehicle 12 (e.g. in a front-wheel drive electric vehicle), or may extend toward the rear wheels of the electric vehicle (e.g. in a rear-wheel drive electric vehicle). It is also to be appreciated that the first and second axle shafts 36, 38 need not extend completely to the wheels of the set of wheels 14. Although not required, the assembly 10 may include one or more additional shafts or components that couple the first axle shaft 36 to one wheel of one of the set of wheels 14, and the assembly 10 may include one or more additional shafts or components that couple the second axle shaft 38 to the other wheel of one of the set of wheels 14.

In other words, the first set of wheels 14 may be the front wheels of the electric vehicle 12 and the second set of wheels 16 may be the rear wheels of the vehicle 12 (e.g. in a front-wheel drive electric vehicle), or the first set of wheels 14 may be the rear wheels of the electric vehicle 12 and the second set of wheels 16 may be the front wheels of the vehicle 12 (e.g. in a rear-wheel drive electric vehicle). One of the first and second axle shafts 36, 38 may extend through the input shaft 18. In other words, in the embodiments where the input shaft 18 is hollow, either the first axle shaft 36 or the second axle shaft 38 may extend through the input shaft 18. More specifically, either the first axle shaft 36 or the second axle shaft 38 may extend through the first bore 34 defined through the input shaft 18.

In the embodiments where one of the first and second axle shafts 36, 38 extends through the input shaft 18, packaging space of the assembly 10 is further reduced. The electric motor 20, input shaft 18, final drive 32, and first and second axle shafts 36, 38 may all be co-axially aligned with the first axis A1, utilizing packaging space in a chassis of the electric vehicle 12 that is typically underutilized.

In one embodiment, the first axis A1 extends parallel to the second axis A2 such that the input shaft 18 extends parallel to both the intermediate input shaft 26 and the output shaft 28. In the embodiments where the first axle shaft 36 or the second axle shaft 38 extends through the input shaft 18, the first axis A1 extends between the set of wheels 14 of the electric vehicle 12 such that the first axis A1 is transverse to the electric vehicle 12. Thus, the second axis A2, as well as the intermediate input shaft 26 and output shaft 28, may also be transverse to the electric vehicle 12. The first axis A1 and the second axis A2 being transverse to the electric vehicle 12 further reduces the packaging space of the assembly 10.

As shown in FIGS. 2, 5, 8, and 11, the intermediate input shaft 26 may be hollow. In other words, the intermediate input shaft 26 may define a second bore 40 extending through the intermediate input shaft 26 along the second axis A2. The output shaft 28 may be disposed at least partially within the intermediate input shaft 26. More specifically, the output shaft 28 may be disposed at least partially within the second bore 40 defined by the intermediate input shaft 26. Alternatively, as shown in FIGS. 1, 3, 4, 6, 7, 9, 10, and 12, the intermediate input shaft 26 may be solid (i.e., not hollow).

The assembly 10 may include a first torque transmission member 42 rotatably coupled to the input shaft 18 and a second torque transmission member 44 rotatably coupled to the intermediate input shaft 26 and configured to receive rotational torque from the first torque transmission member 42. It is to be appreciated that the first torque transmission member 42 may be integral with the input shaft 18 or may be a separate component than the input shaft 18. In embodiments where the first torque transmission member 42 is a separate component than the input shaft 18, the first torque transmission member 42 may be rotatably coupled to the input shaft 18. It is also to be appreciated that the second torque transmission member 44 may be integral with the intermediate input shaft 26 or may be a separate component than the intermediate input shaft 26. In embodiments where the second torque transmission member 44 is a separate component than the intermediate input shaft 26, the second torque transmission member 44 may be rotatably coupled to the intermediate input shaft 26.

The first torque transmission member 42 may be further defined as a first sprocket 46, and the second torque transmission member 44 may be further defined as a second sprocket 48. The first and second sprockets 46, 48 may both be configured to transmit rotational torque between one another through a flexible drive, such as a chain or a belt. The assembly 10 may further include a first flexible drive 50 coupled to the first and second sprockets 46, 48 to transmit rotational torque from the input shaft 18 to the intermediate input shaft 26. Alternatively, the first torque transmission member 42 may be further defined as a first gear, and the second torque transmission member may be further defined as a second gear. The first and second gears may mesh directly together to transmit torque between one another or may be separated by an additional component such as an additional gear to transmit torque between one another.

The first torque transmission member 42 and the second torque transmission member 44 may introduce a first gear reduction R1 between the input shaft 18 and the intermediate input shaft 26. The first gear reduction R1 may decrease the rotational speed of the intermediate input shaft 26 relative to the input shaft 18 and increase the rotational torque of the intermediate input shaft 26 relative to the input shaft 18. Dependent upon the design and configuration of the first and second torque transmission members 42, 44, the first gear reduction R1 may be anywhere in a wide range of gear reductions. Moreover, because a distance between the input shaft 18 and the intermediate input shaft 26 may remain static, the design and configuration of the first and second torque transmission members 42, 44 may be altered to change the first gear reduction R1. In this way, the assembly 10 provides flexibility with regard to how much rotational torque is delivered from the input shaft 18 to the intermediate input shaft 26 without having to change the distance between the input shaft 18 and the intermediate input shaft 26.

As described above, the assembly 10 includes the planetary gearset 30 to transmit rotational torque between the intermediate input shaft 26 and the output shaft 28. Thus, rotational torque provided to the input shaft 18 by the electric motor 20 may be transmitted from the input shaft 18 to the intermediate input shaft 26 via the first and second torque transmission members 42, 44, and then transmitted to the output shaft 28 via the planetary gearset 30.

The planetary gearset 30 may provide a second gear reduction R2 between the intermediate input shaft 26 and the output shaft 28. The second gear reduction R2 may decrease the rotational speed of the output shaft 28 relative to the intermediate input shaft 26 and increase the rotational torque of the output shaft 28 relative to the intermediate input shaft 26. The planetary gearset 30 may be a two-speed gearset configured to provide, between the intermediate input shaft 26 and the output shaft 28, a first gear ratio or a second gear ratio different from the first gear ratio. The first gear ratio may be 1:1. In other words, the first gear ratio may provide no gear reduction between the intermediate input shaft 26 and the output shaft 28. However, it is to be appreciated that the first and/or second gear ratios may result in a wide range of second gear reductions R2, including, but not limited to, about 1.5:1, 1.96:1, 2.34:1, 2.46:1, 2.61:1, 2.64:1, 2.69:1, 2.72:1, 2.74:1, etc.

The planetary gearset 30 may be further defined as a range planetary gearset. The planetary gearset 30 may have a sun gear 52, a planet gear 54 (typically a plurality of planet gears 54), a planet carrier 56, and a ring gear 58. The planet gear 54 is coupled to the sun gear 52 and the ring gear 58. More specifically, the planet gear 54 is positioned radially between and is engaged with the sun gear 52 and the ring gear 58. The planet carrier 56 is coupled to the planet gear 54 and rotates relative to the sun gear 52 as the planet gear 54 orbits the sun gear 52. The ring gear 58 is coupled to the planet gear 54 such that the planet gear 54 is disposed radially between the sun gear 52 and the ring gear 58. The sun gear 52 of the planetary gearset 30 may be rotatably coupled to the intermediate input shaft 26. The planet carrier 56 may be rotatably coupled to the output shaft 28.

The assembly 10 may further include a first clutch 94 operatively coupled to the planetary gearset 30 and a second clutch 96 operatively coupled to the planetary gearset 30. The first and second clutches 94, 96 are both moveable between engaged and disengaged positions.

When the first clutch 94 is in the engaged position and the second clutch 96 is in the disengaged position, the assembly 10 may provide the first gear ratio. More specifically, the sun gear 52, the planet gear 54, and the planet carrier 56 may be rotatably locked together such that the planetary gearset 30 has a gear ratio of 1, as described above. This is considered a high driving ratio because the planetary gearset 30 does not decrease the rotational speed of the output shaft 28 relative to the intermediate input shaft 26 and does not increase the rotational torque of the output shaft 28 relative to the intermediate input shaft 26.

When the first clutch 94 is in the disengaged position and the second clutch 96 is in the engaged position, the planet gear 54 is allowed to orbit around sun gear 52 such that the assembly 10 provides the second gear ratio. The second gear ratio may be determined by the ratio of the planetary carrier 56 to the sun gear 52. This is considered a low driving ratio because the planetary gearset 30 decreases the rotational speed of the output shaft 28 relative to the intermediate input shaft 26 and increases the rotational torque of the output shaft 28 relative to the intermediate input shaft 26.

When the first clutch 94 is in the disengaged position and the second clutch 96 is in the disengaged position, the assembly 10 is at neutral and no rotational torque may be transmitted between the electric motor 20 and the set of wheels 14 of the electric vehicle 12.

As shown in FIGS. 1-12, the output shaft may be solid (i.e., not hollow). Alternatively, the output shaft 28 may be hollow. In other words, the output shaft 28 may define a third bore extending through the output shaft 28 along the second axis A2.

The assembly 10 may include a third torque transmission member 60 rotatably coupled to the output shaft 28 and the assembly 10 may include a fourth torque transmission member 62 rotatably coupled to the final drive 32 and configured to receive rotational torque from the third torque transmission member 60. It is to be appreciated that the third torque transmission member 60 may be integral with the output shaft 28 or may be a separate component than the output shaft 28. In the embodiments where the third torque transmission member 60 is a separate component than the output shaft 28, the third torque transmission member 60 may be rotatably coupled to the output shaft 28. It is also to be appreciated that the fourth torque transmission member 62 may be integral with the final drive 32 or may be a separate component than the final drive 32. In the embodiments where the fourth torque transmission member 62 is a separate component than the final drive 32, the fourth torque transmission member 62 may be rotatably coupled to the final drive 32.

The third torque transmission member 60 may be further defined as a third sprocket 64, and the fourth torque transmission member 62 may be further defined as a fourth sprocket 66. The third and fourth sprockets 64, 66 may both be configured to transmit rotational torque between one another through a flexible drive, such as a chain or a belt. The assembly 10 may further include a second flexible drive 72 coupled to the third and fourth sprockets 64, 66 to transmit rotational torque from the output shaft 28 to the final drive 32. Alternatively, the third torque transmission member 60 may be further defined as a third gear, and the fourth torque transmission member may be further defined as a fourth gear. The third or fourth gears may mesh directly together to transmit torque between one another or may be separated by an additional component such as an additional gear to transmit torque between one another. It is also to be appreciated that the fourth torque transmission member 62 may be a ring gear rotatably coupled to the final drive 32.

The third torque transmission member 60 and the fourth torque transmission member 62 may introduce a third gear reduction R3 between the output shaft 28 and the final drive 32. The third gear reduction R3 may decrease the rotational speed of the final drive 32 relative to the output shaft 28 and increase the rotational torque of the final drive 32 relative to the output shaft 28. Dependent upon the design and configuration of the third and fourth torque transmission members 60, 62, the third gear reduction R3 may be anywhere in a wide range of gear reductions. Moreover, because a distance between the output shaft 28 and the final drive 32 may remain static, the design and configuration of the third and fourth torque transmission members 60, 62 may be altered to change the third gear reduction R3. In this way, the assembly 10 provides flexibility with regard to how much rotational torque is delivered from the output shaft 28 to the final drive 32 without having to change the distance between the output shaft 28 and the final drive 32.

It is to be appreciated that the intermediate input shaft 26 may extend between a first intermediate shaft end rotatably coupled to the second torque transmission member 44 and a second intermediate shaft end spaced from the first intermediate shaft end along the second axis A2, with the second intermediate shaft end rotatably coupled to the sun gear 52. Moreover, it is also to be appreciated that the output shaft 28 may extend between a first output shaft end rotatably coupled to the planet carrier 56 and a second output shaft end spaced from the first output shaft end along the second axis A2, with the second output shaft end rotatably coupled to the third torque transmission member 60.

Thus, rotational torque provided to the input shaft 18 by the electric motor 20 may be transmitted from the input shaft 18 to the intermediate input shaft 26 via the first and second torque transmission members 42, 44, then transmitted to the output shaft 28 via the planetary gearset 30, then transmitted from the output shaft 28 to the final drive 32 via the third and fourth torque transmission members 60, 62, and finally to one or both of the first and second axle shafts 36, 38 to one or both of the wheels of the set of wheels 14 to propel the electric vehicle 12. More specifically, rotational torque may be transmitted from the intermediate input shaft 26 to the output shaft 28 through the sun gear 52, to the planet gear 54, to the planet carrier 56, and finally to the output shaft 28.

The total gear reduction between the electric motor 20 and the set of wheels 14 of the electric vehicle 12, therefore, is equal to the first gear reduction R1, multiplied by the second gear reduction R2, multiplied by the third gear reduction R3. In the embodiments where the planetary gearset 30 has the first gear ratio of 1:1 and is in first gear, the total gear reduction between the electric motor 20 and the set of wheels 14 of the electric vehicle 12 is the first gear reduction R1 multiplied by the third gear reduction R3 because the second gear reduction R2 is equal to 1.

The electric motor 20 may extend between a first motor end 68 and a second motor end 70 spaced from the first motor end 68 along the first axis A1. The first motor end 68 is proximate to the first torque transmission member 42 and the second motor end 70 is distal to the first torque transmission member 42. The second motor end 70 may include electrical connections connectable through electrical wires to a source of electrical energy, such as a battery, to power the electric motor 20. These electrical wires take up packaging space within the chassis of the electric vehicle 12. Additionally, the longer the length of the electrical wires, the greater the resistance present between the battery and the electric motor 20. Moreover, it is desirable to avoid proximity of the electrical wires with other components of the assembly 10, particularly moveable components of the assembly 10, to reduce the possibility of damage to the electrical wires. As such, it is desirable to position the second motor end 70 facing the exterior of the electric vehicle 12 to allow the electrical wires to have easy access to the electrical connections to power the electric motor 20.

Although not required, the first torque transmission member 42 may be aligned with the second torque transmission member 44. In other words, the first torque transmission member 42 and the second torque transmission member 44 may be co-planar with one another along a first plane P1 perpendicular to the first axis A1 and the second axis A2. Moreover, although not required, the third torque transmission member 60 may be aligned with the fourth torque transmission member 62. Said differently, the third torque transmission member 60 and the fourth torque transmission member 62 may be co-planar with one another along a second plane P2 perpendicular to the first axis A1 and the second axis A2. The first plane P1 and the second plane P2 may be longitudinal relative to the electric vehicle 12.

As shown in FIGS. 2, 5, 8, and 11, the second torque transmission member 44 rotatably coupled to the intermediate input shaft 26 may be aligned with the first torque transmission member 42 rotatably coupled to the input shaft 18 such that the first torque transmission member 42 is disposed between the final drive 32 and the electric motor 20 with respect to the first axis A1. The second torque transmission member 44 being aligned with the first torque transmission member 42 such that the first torque transmission member 42 is disposed between the final drive 32 and the electric motor 20 with respect to the first axis A1 results in the first motor end 68 of the electric motor 20 facing the final drive 32 and the second motor end 70 of the electric motor 20 and the electrical connections on the second motor end 70 facing away from the final drive 32. Moreover, the second torque transmission member 44 being aligned with the first torque transmission member 42 in combination with the first torque transmission member 42 being disposed between the electric motor 20 and the final drive 32 allows the benefits described above in addition to allowing the planetary gearset 30 to be spaced with respect to the second axis A2 away from the second torque transmission member 44 due to the presence of the intermediate input shaft 26, further reducing the packaging space of the assembly 10.

Moreover, the first torque transmission member 42 being disposed between the electric motor 20 and the final drive 32 results in the first torque transmission member 42 and the fourth torque transmission member 62 being adjacent to one another (i.e., not separated by the electric motor 20). In this embodiment, the second torque transmission member 44 and the third torque transmission member 60 are also adjacent to one another (i.e., not separated by the planetary gearset 30). Thus, the first flexible drive 50 and the second flexible drive 72 may also be adjacent to one another, further reducing the packaging space of the assembly 10 and placing similar components in proximity with one another. Placing similar components, such as the first flexible drive 50 and the second flexible drive 72, in proximity with one another assists in directing lubrication to components.

In other embodiments, as shown in FIGS. 1, 3, 4, 6, 7, 9, 10, and 12, the first torque transmission member 42 is spaced from the fourth torque transmission member 62 along the first axis A1 such that the electric motor 20 is disposed axially between the first torque transmission member 42 and the fourth torque transmission member 62. In these embodiments, the second torque transmission member 44 is spaced from the third torque transmission member 60 along the second axis A2 such that the planetary gearset 30 is disposed axially between the second torque transmission member 44 and the third torque transmission member 60. The assembly 10 may include no components other than the first flexible drive 50 and the second flexible drive 72 that are not co-axially aligned with either the first axis A1 or the second axis A2.

It is to be appreciated that the final drive 32 may be a differential. In non-limiting examples, the differential may be an open differential, a locking differential, a limited-slip differential, an electronically controlled limited-slip differential, a torque-vectoring differential, a mechanical clutch-type differential, or a spur gear differential.

Figure 1:
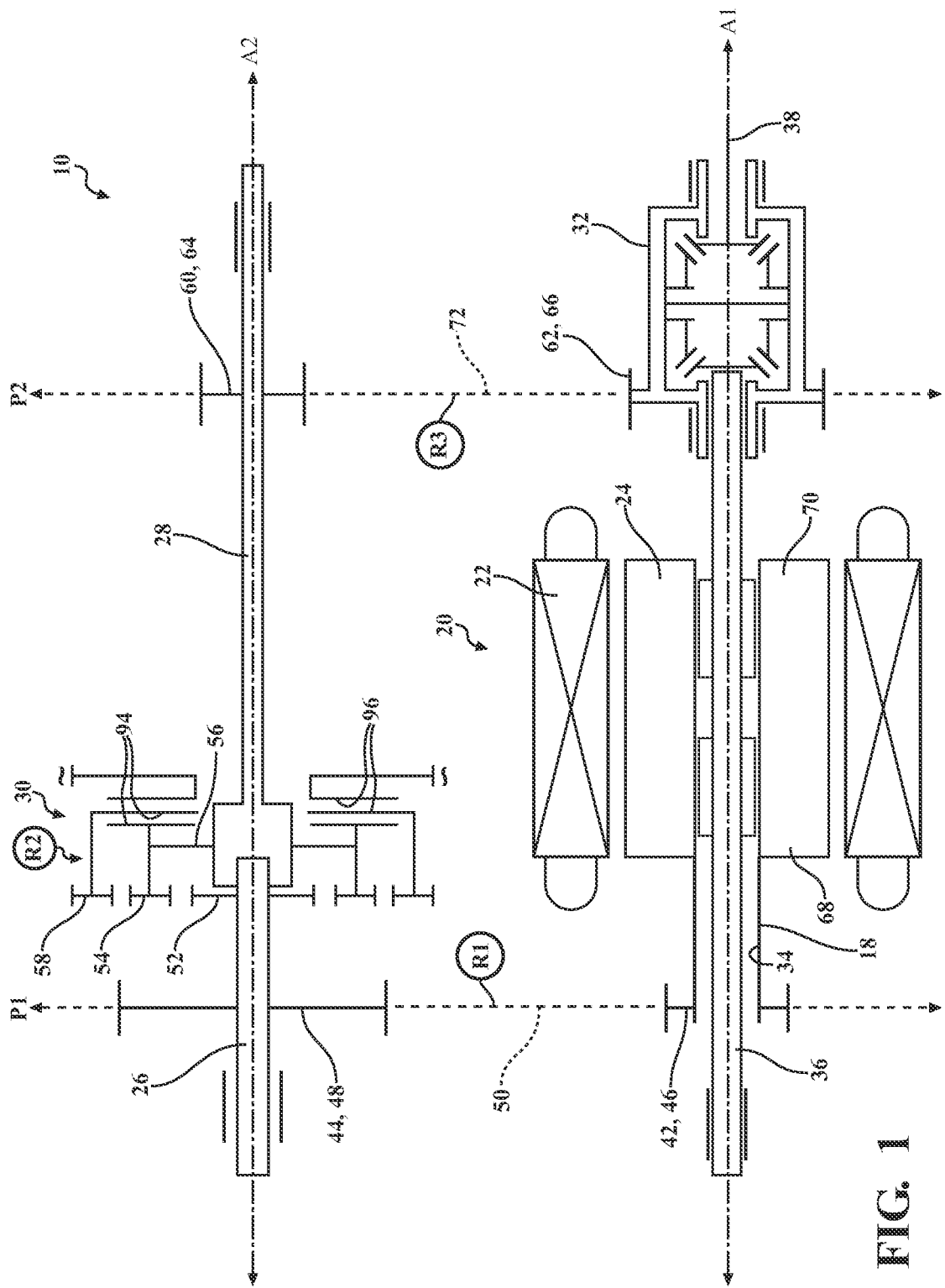
FIG. 1 is a schematic illustration of an assembly, with the assembly including an electric motor, an input shaft, an intermediate input shaft, a planetary gearset, an output shaft, a final drive, and first and second axle shafts.
Figure 2:
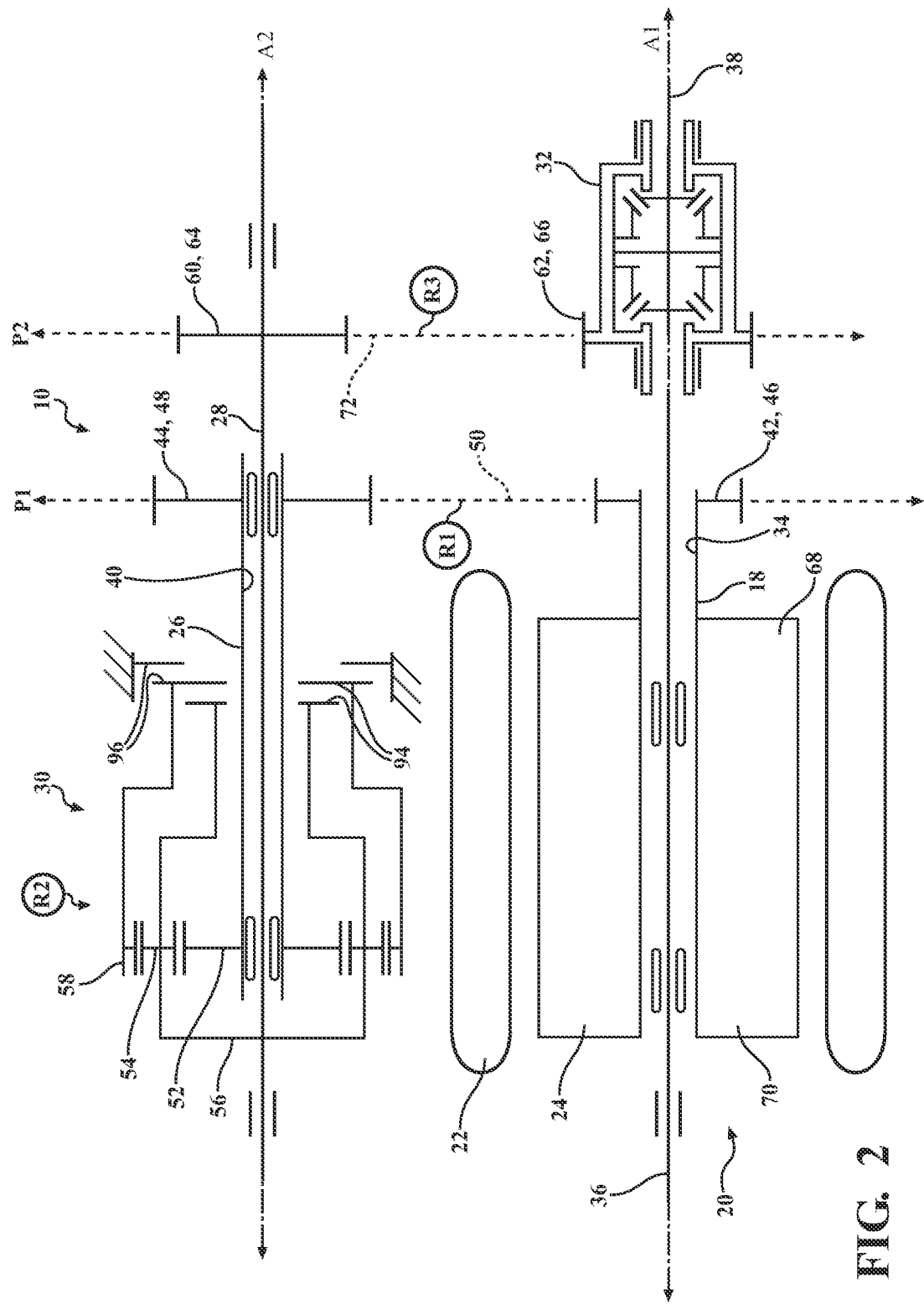
FIG. 2 is a schematic illustration of another embodiment of the assembly, with the assembly including the planetary gearset and with the intermediate input shaft being hollow.
Figure 3:
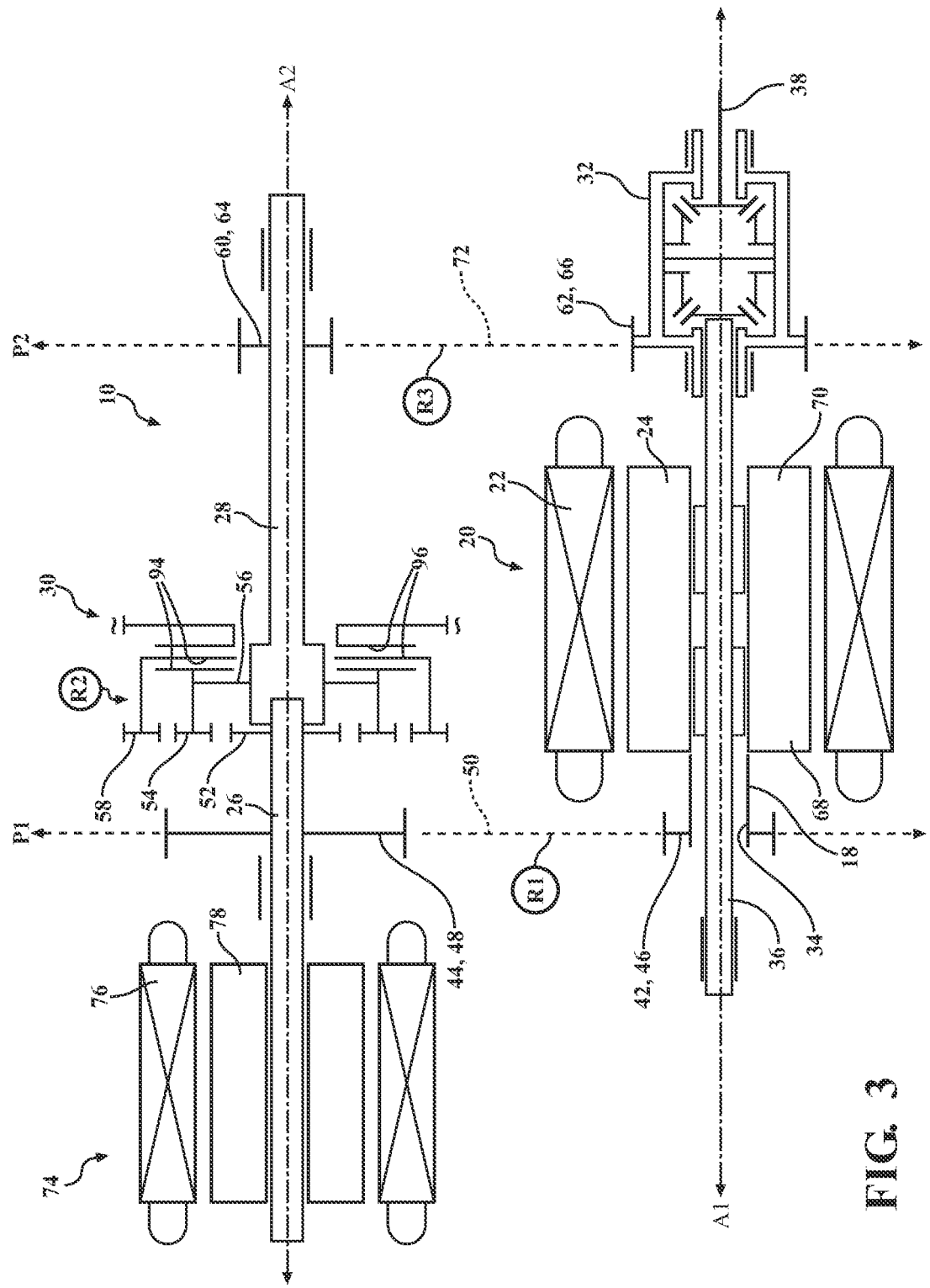
FIG. 3 is a schematic illustration of another embodiment the assembly, with the assembly including the planetary gearset and including a second electric motor rotatably coupled to the intermediate input shaft.
Figure 4:
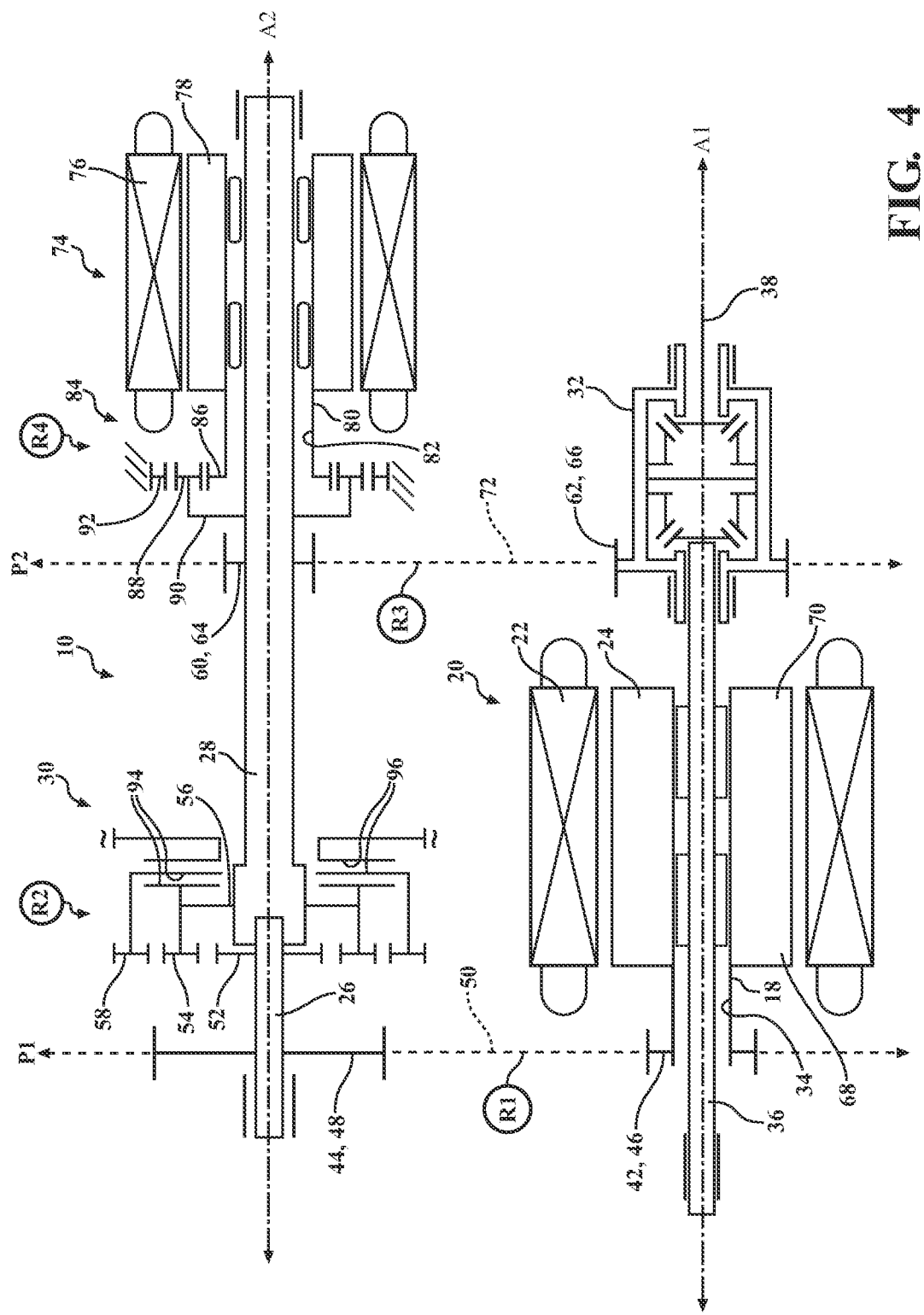
FIG. 4 is a schematic illustration of another embodiment of the assembly, with the assembly including the planetary gearset and including a second input shaft rotatably coupled to the second electric motor and a second planetary gearset rotatably coupled to the output shaft and the second input shaft, and with the intermediate input shaft being solid.
Figure 5:
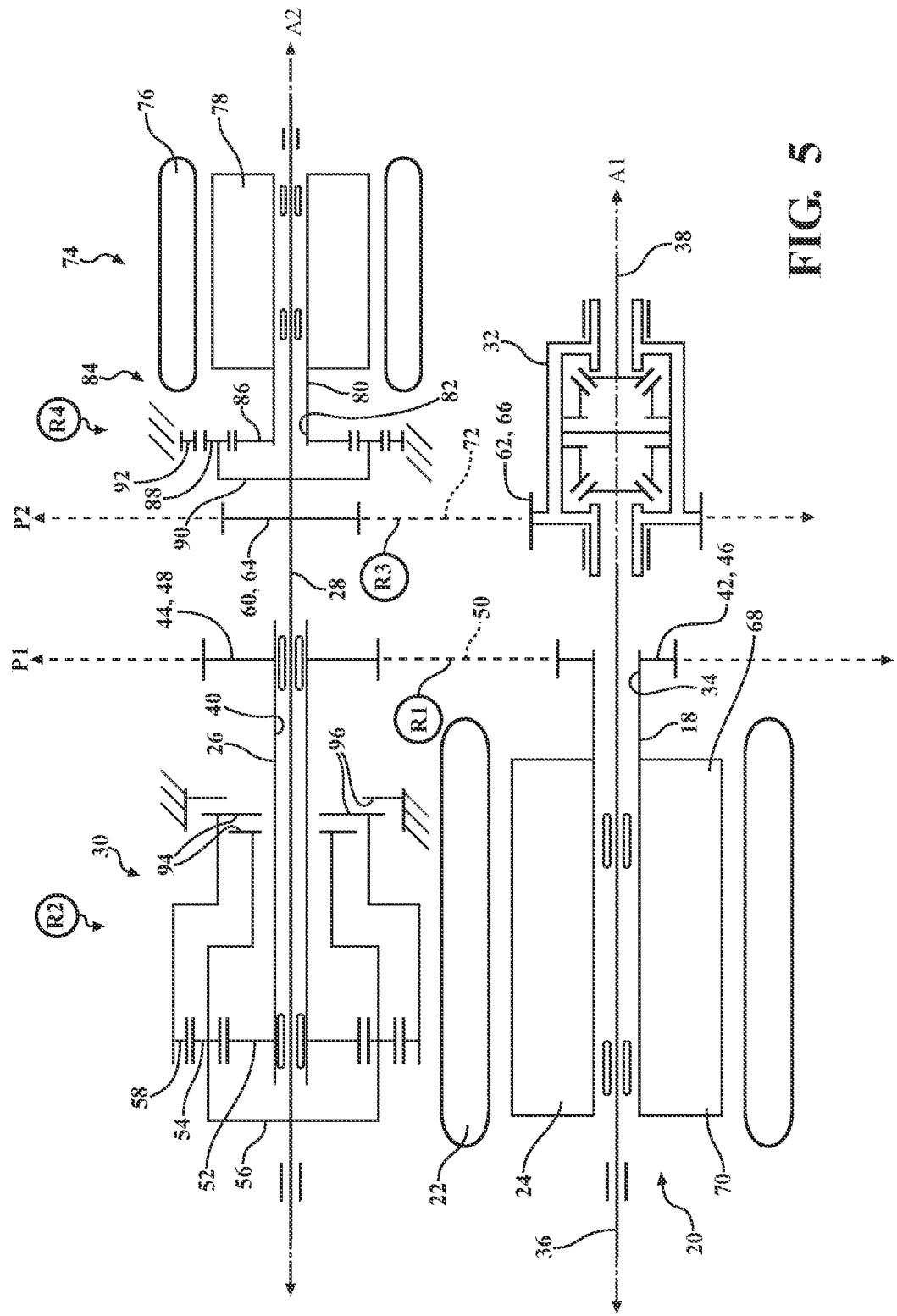
FIG. 5 is a schematic illustration of another embodiment of the assembly, with the assembly including the planetary gearset and including the second input shaft rotatably coupled to a second electric motor and the second planetary gearset rotatably coupled to the output shaft and the second input shaft, and with the intermediate input shaft being hollow.
Figure 9:
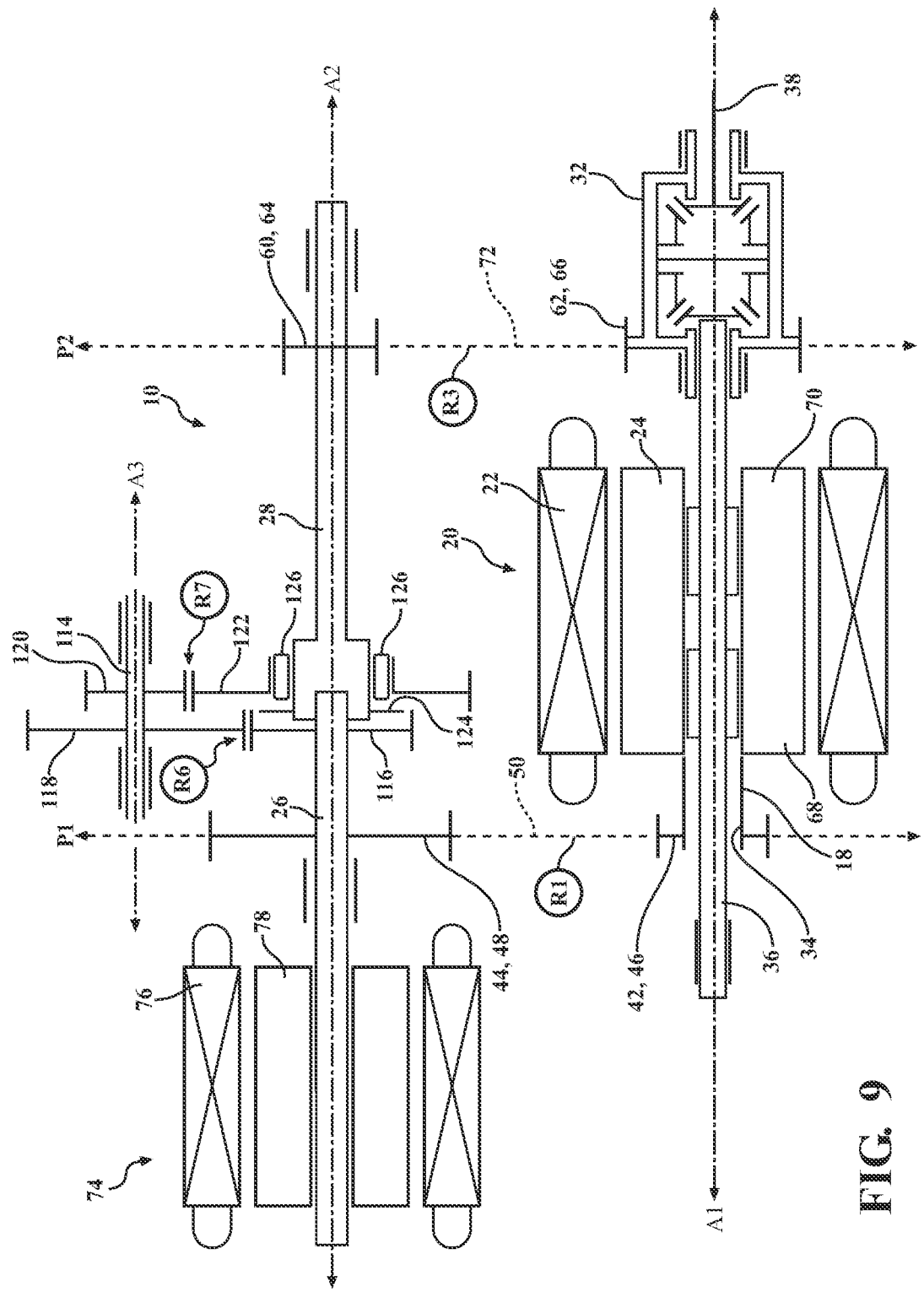
FIG. 9 is a schematic illustration of another embodiment the assembly, with the assembly including the transfer shaft and including a second electric motor rotatably coupled to the intermediate input shaft.
Figure 10:
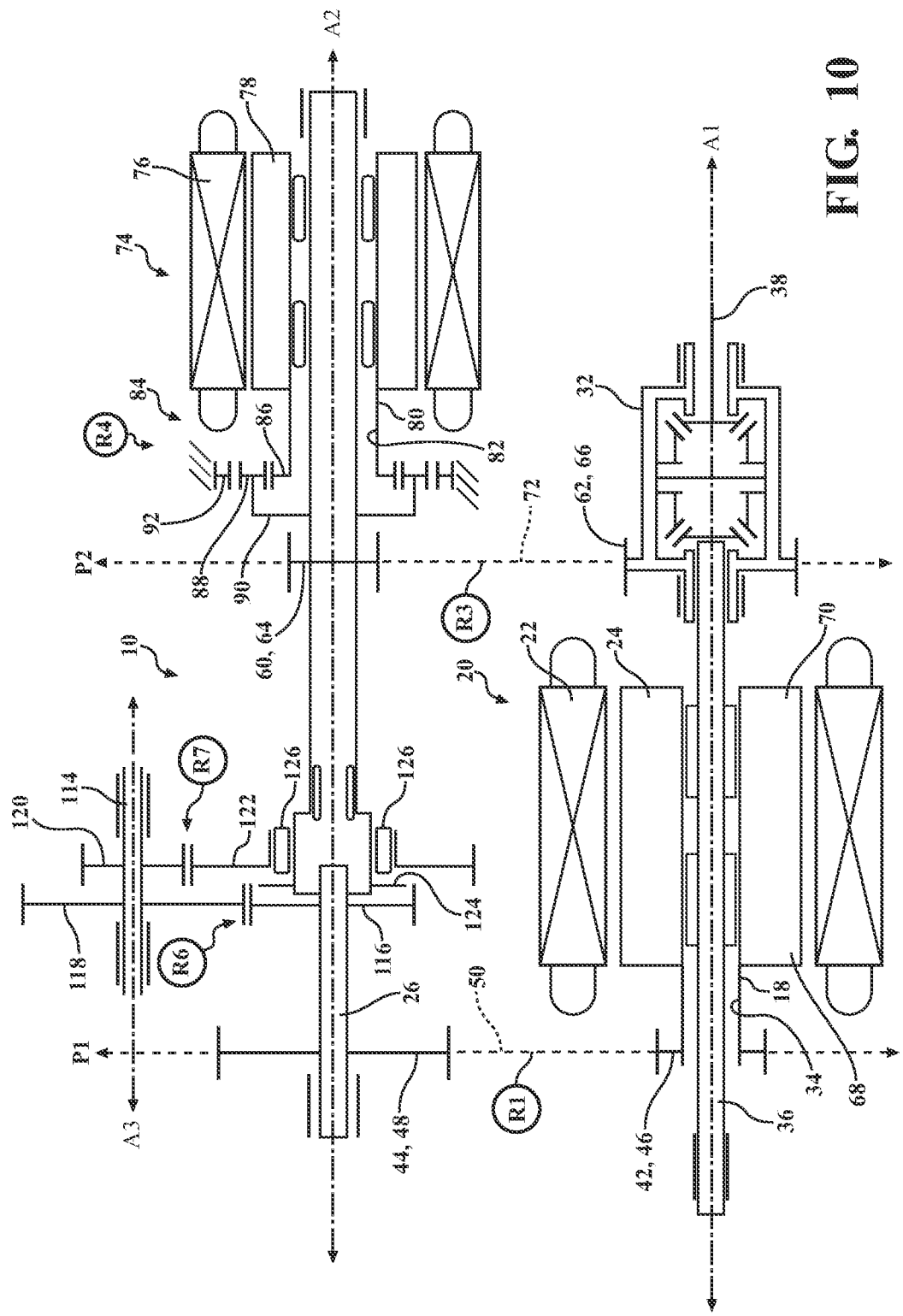
FIG. 10 is a schematic illustration of another embodiment of the assembly, with the assembly including the transfer shaft and including a second input shaft rotatably coupled to the second electric motor and a second planetary gearset rotatably coupled to the output shaft and the second input shaft, and with the intermediate input shaft being solid.
Figure 11:
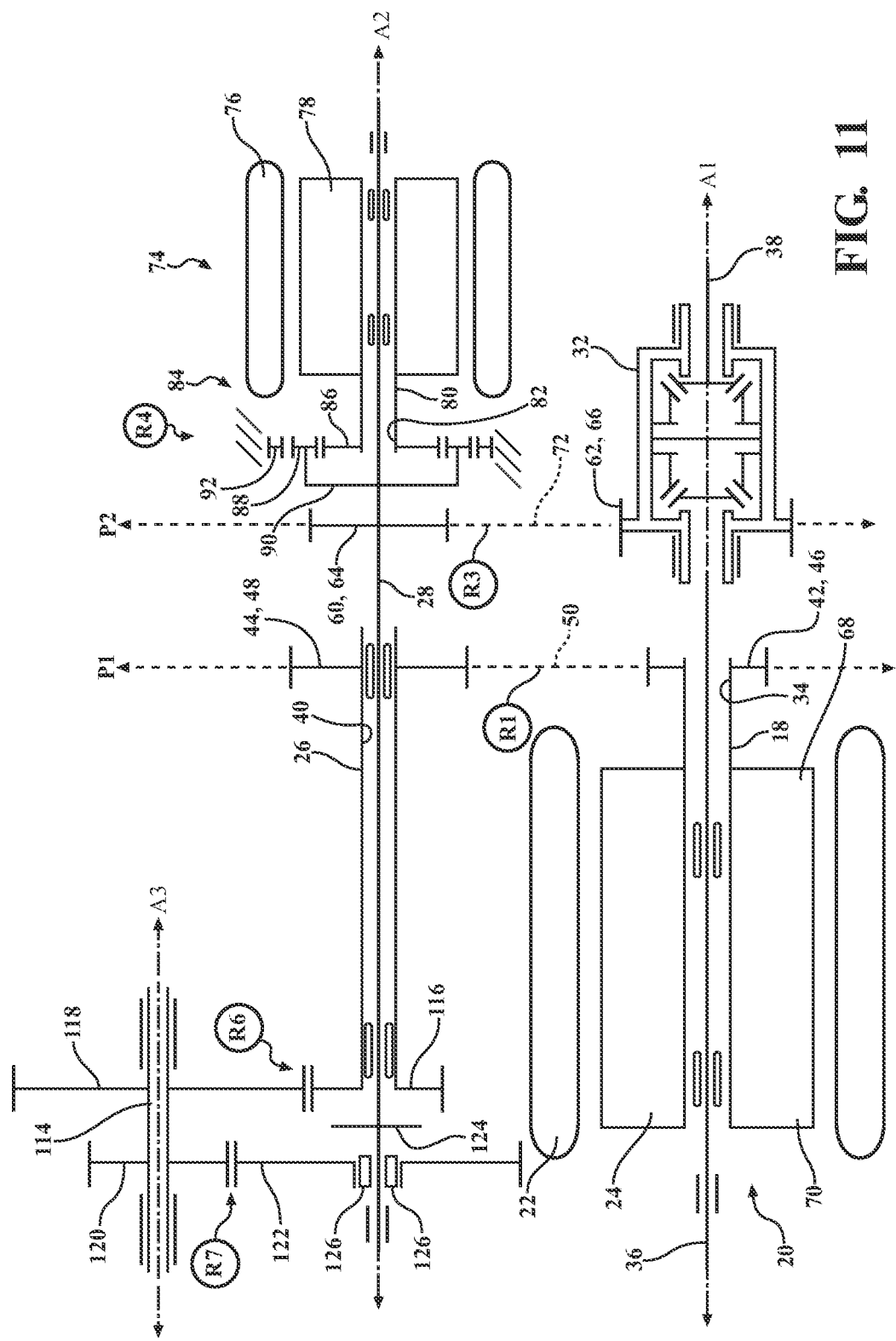
FIG. 11 is a schematic illustration of another embodiment of the assembly, with the assembly including the transfer shaft and including the second input shaft rotatably coupled to a second electric motor and the second planetary gearset rotatably coupled to the output shaft and the second input shaft, and with the intermediate input shaft being hollow.

Although not required, the electric motor 20 may be further defined as a first electric motor 20, and the assembly 10 may further include a second electric motor 74 co-axially aligned with the second axis A2 and configured to provide rotational torque to at least one of the intermediate input shaft 26 and the output shaft 28. In other words, the second electric motor 74 may be configured to provide rotational torque to the intermediate input shaft 26, as shown in FIGS. 3 and 9, or may be configured to provide rotational torque to the output shaft 28, as shown in FIGS. 4, 5, 10, and 11. It is to be appreciated that the second electric motor 74 may have all components of the first electric motor 20 as described herein, including a second stator 76 and a second rotor 78 that rotates relative to the second stator 76.

The second electric motor 74 may assist with packaging the assembly 10 in the chassis of the electric vehicle, particularly near components co-axially aligned with the first axis A1, by allowing the assembly 10 to provide the same amount of rotational torque to the set of wheels 14 of the electric vehicle 12 and having a smaller first electric motor 20. Moreover, the second electric motor 74 may provide additional rotational torque to the set of wheels 14 of the electric vehicle 12 that is not possible with only the first electric motor 20 in the packaging space available for the first electric motor 20. Even further, the second electric motor 74 provides redundancy to the assembly 10 in that the assembly 10 is still able to provide rotational torque to the set of wheels 14 of the electric vehicle 12 in the event of failure of the first electric motor 20.

The first electric motor 20 is configured to provide a first rotational torque to the input shaft 18. The first rotational torque is a maximum rotational torque the first electric motor 20 is capable of producing. In the embodiments with the second electric motor 74, the second electric motor 74 is configured to provide a second rotational torque to either the intermediate input shaft 26 or to the output shaft 28. The second rotational torque is a maximum rotational torque the second electric motor 74 is capable of producing. The second rotational torque produced from the second electric motor 74 may be added to the first rotational torque produced from the first electric motor 20 before being transmitted to the set of wheels 14 of the electric vehicle 12.

In one embodiment, the second rotational torque may be less than the first rotational torque. For example, the second electric motor 74 may be sized smaller than the first electric motor 20. The second electric motor 74 being sized smaller than the first electric motor 20 may assist in packaging considerations in the chassis of the electric vehicle, particularly near components co-axially aligned with the first axis A, by allowing the assembly 10 to provide the same amount of rotational torque to the set of wheels 14 of the electric vehicle 12 and having a smaller first electric motor 20. Moreover, the second electric motor 74 may provide additional rotational torque to the set of wheels 14 of the electric vehicle 12 that is not possible with only the first electric motor 20 in the packaging space available for the first electric motor 20.

In another embodiment, the second rotational torque may be more than the first rotational torque. For example, the second electric motor 74 may be sized larger than the first electric motor 20. The second electric motor 74 being sized larger than the first electric motor 20 may provide additional rotational torque to the set of wheels 14 of the electric vehicle 12 that is not possible with only the first electric motor 20 in the packaging space available for the first electric motor 20. In yet another embodiment, it is to be appreciated that the first rotational torque may be the same as the second rotational torque. In other words, the first electric motor 20 and the second electric motor 74 may be the same size.

As shown in FIGS. 4, 5, 10, and 11, the second electric motor 74 may be rotatably coupled to the intermediate input shaft 26 such that the second electric motor 74 is configured to provide rotational torque to the intermediate input shaft 26. The second electric motor 74 may be configured to provide rotational torque directly to the intermediate input shaft 26. Said differently, the second rotor 78 of the second electric motor 74 may be rotatably coupled to the intermediate input shaft 26 to provide rotational torque to the intermediate input shaft 26, and there may be no intervening components between the second electric motor 74 and the intermediate input shaft 26. Alternatively, it is to be appreciated that the second electric motor 74 may be configured to provide rotational torque indirectly to the intermediate input shaft 26. In a non-limiting example, the second electric motor 74 may provide rotational torque to the intermediate input shaft 26 through intervening components such as, but not limited to, an intervening shaft, an intervening gear, or an intervening flexible drive such as an intervening chain.

As shown in FIGS. 4, 5, 10, and 11 the second electric motor 74 may be rotatably coupled to the output shaft 28 such that the second electric motor 74 is configured to provide rotational torque to the output shaft 28. The second electric motor 74 may be configured to provide rotational torque directly to the output shaft 28. Said differently, the second rotor 78 of the second electric motor 74 may be rotatably coupled to the output shaft 28 to provide rotational torque to the output shaft 28, and there may be no intervening components between the second electric motor 74 and the output shaft 28. Alternatively, it is to be appreciated that the second electric motor 74 may be configured to provide rotational torque indirectly to the output shaft 28. In a non-limiting example, the second electric motor 74 may provide rotational torque to the output shaft 28 through intervening components such as, but not limited to, an intervening shaft, an intervening gear, or an intervening flexible drive such as an intervening chain.

More specifically, as shown in FIGS. 4, 5, 10, and 11, the assembly 10 may further include a second input shaft 80 rotatably coupled to the second electric motor 74 and co-axially aligned with the second axis A2. The second input shaft 80 assists the second electric motor 74 in transmitting rotational torque indirectly to the output shaft 28. The second rotor 78 of the second electric motor 74 may be rotatably coupled to the second input shaft 80 to provide rotational torque to the second input shaft 80. The second input shaft 80 may be hollow. In other words, the second input shaft 80 may define a fourth bore 82 extending through the second input shaft 80 along the second axis A2. The output shaft 28 may be disposed at least partially in the second input shaft 80. More specifically, the output shaft 28 may be disposed at least partially within the fourth bore 82 defined by the second input shaft 80.

In the embodiments where the second electric motor 74 is rotatably coupled to the output shaft 28, the second electric motor 74 may transmit rotational torque to the output shaft 28, the final drive 32, and the set of wheels 14 of the electric vehicle 12 without having to pass through the planetary gearset 30. Therefore, when the first and second clutches 94, 96 are in the disengaged positions and the assembly 10 is at neutral, the second electric motor 74 may still provide rotational torque to the set of wheels 14 of the electric vehicle 12.

The planetary gearset 30 may further be defined as a first planetary gearset 30. The assembly 10 may further include a second planetary gearset 84 rotatably coupled to the output shaft 28 and the second input shaft 80, as shown in FIGS. 4, 5, 10, and 11. The second planetary gearset 84 is co-axially aligned with the second axis A2 and configured to transmit rotational torque from the second input shaft 80 to the output shaft 28. The second planetary gearset 84 may include all or some of the same components as the first planetary gearset 30. More specifically, the second planetary gearset 84 may provide a fourth gear reduction R4 between the second input shaft 80 and the output shaft 28. The fourth gear reduction R4 may decrease the rotational speed of the output shaft 28 relative to the second input shaft 80 and increase the rotational torque of the output shaft 28 relative to the second input shaft 80.

The second planetary gearset 84 may be referred to as a reduction planetary gearset or an e-motor reduction planetary gearset. The second planetary gearset 84 may have a second sun gear 86, a second planet gear 88 (typically a plurality of second planet gears 88), a second planet carrier 90, and a second ring gear 92. The second planet gear 88 is coupled to the second sun gear 86 and the second ring gear 92. More specifically, the second planet gear 88 is positioned radially between and is engaged with the second sun gear 86 and the second ring gear 92. The second planet carrier 90 is coupled to the second planet gear 88 and rotates relative to the second sun gear 86 as the second planet gear 88 orbits the second sun gear 86. The second ring gear 92 is coupled to the second planet gear 88 such that the second planet gear 88 is disposed radially between the second sun gear 86 and the second ring gear 92. The second sun gear 86 of the second planetary gearset 84 may be rotatably coupled to the second input shaft 80. The second planet carrier 90 may be rotatably coupled to the output shaft 28.

In the embodiments with the second electric motor 74 and second planetary gearset 84 rotatably coupled to the output shaft 28, the total gear reduction between the second electric motor 74 and the set of wheels 14 of the electric vehicle 12, therefore, is equal to the fourth gear reduction R4 multiplied by the third gear reduction R3.

Figure 6:
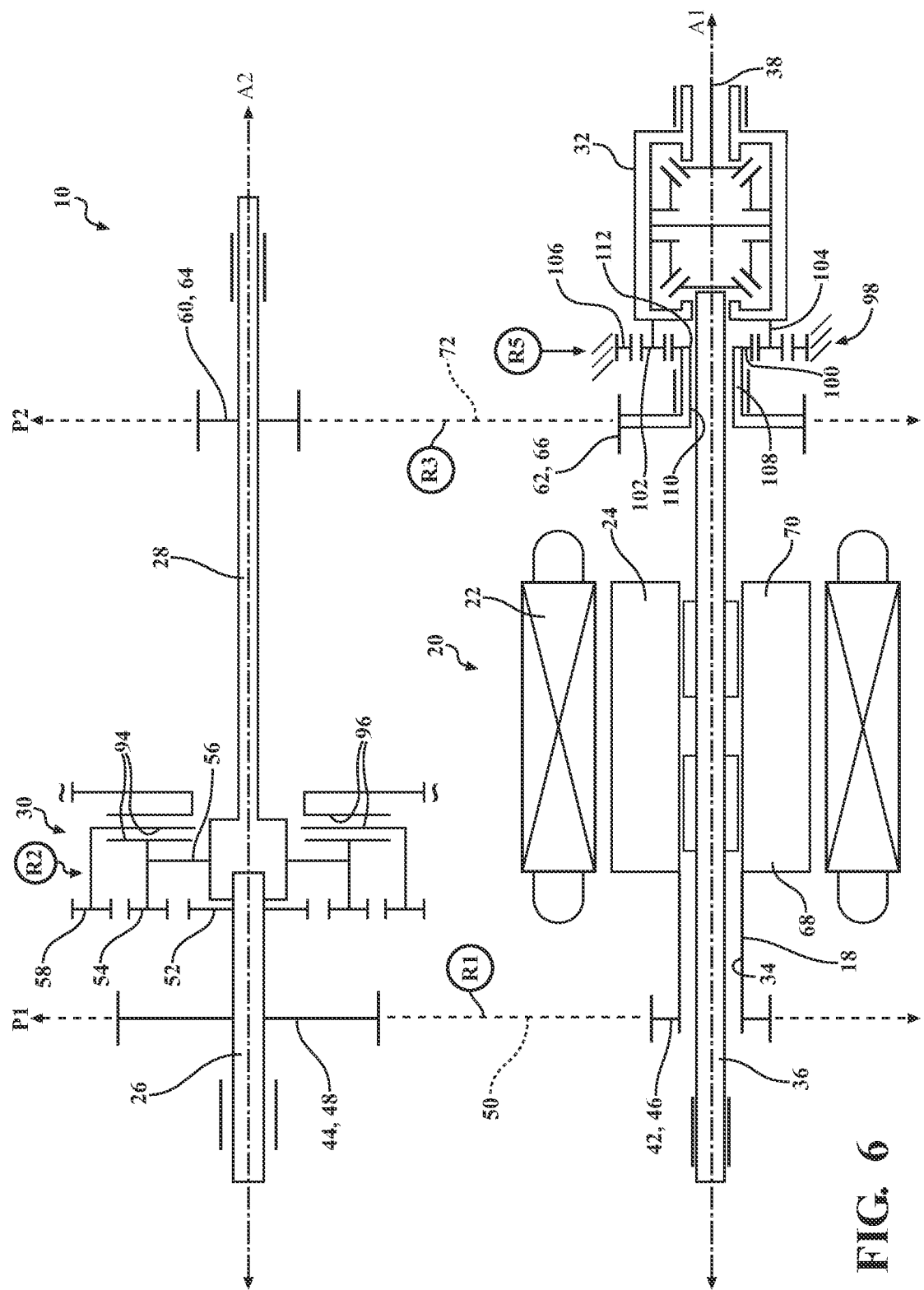
FIG. 6 is a schematic illustration of another embodiment of the assembly, with the assembly including the planetary gearset and including a third planetary gearset rotatably coupled to the final drive.
Figure 7:
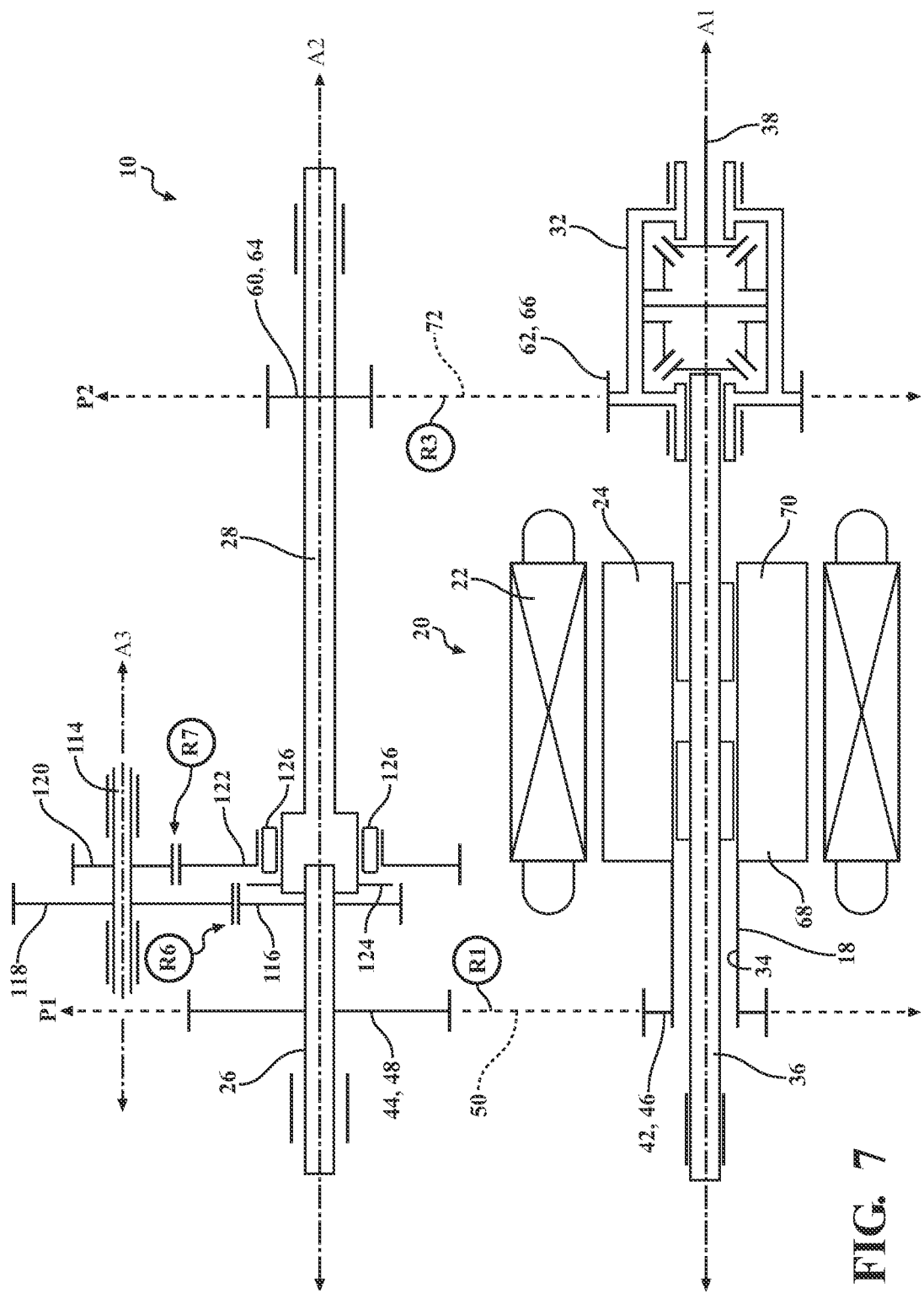
FIG. 7 is a schematic illustration of an assembly, with the assembly including an electric motor, an input shaft, an intermediate input shaft, a transfer shaft, first, second, third, and fourth transfer gears, a transfer clutch, an output shaft, a final drive, and first and second axle shafts.
Figure 8:
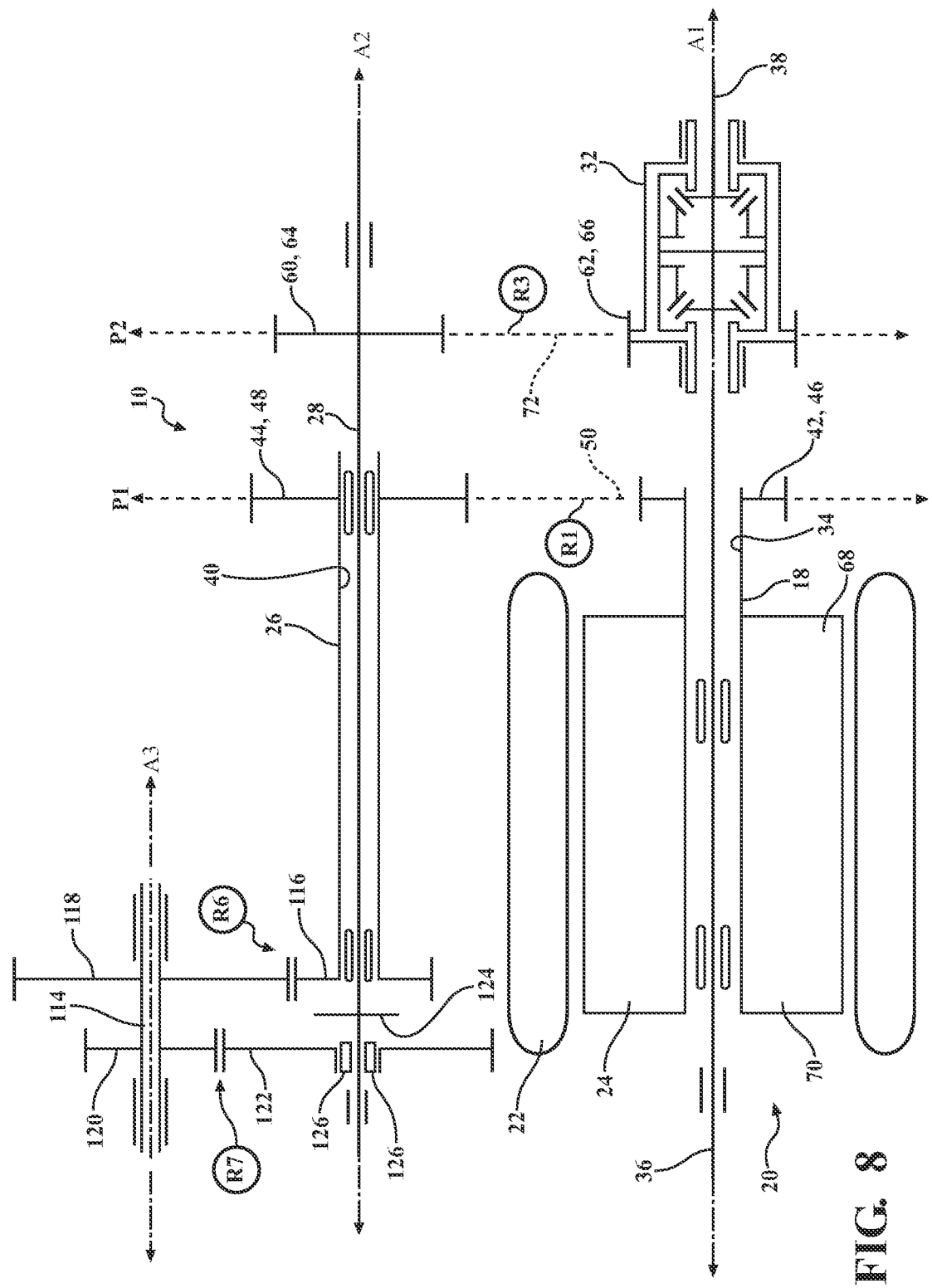
FIG. 8 is a schematic illustration of another embodiment of the assembly, with the assembly including the transfer shaft and with the intermediate input shaft being hollow.

Moreover, as shown in FIGS. 6 and 12, the assembly 10 may include a third planetary gearset rotatably coupled to the final drive 32. It is to be appreciated that, in some embodiments, the assembly 10 may include the third planetary gearset 98 and not include the second planetary gearset 84. However, when present, the third planetary gearset 98 is co-axially aligned with the first axis A1 and configured to transmit rotational torque to the final drive 32. More specifically, the third planetary gearset 98 is configured to transmit rotational torque from the fourth torque transmission member 62 to the final drive 32. The third planetary gearset 98 may include all or some of the same components as the first planetary gearset 30 and/or the second planetary gearset 84. More specifically, the third planetary gearset 98 may provide a fifth gear reduction R5 between the fourth torque transmission member 62 and the final drive 32. The fifth gear reduction R5 may decrease the rotational speed of the final drive 32 relative to the fourth torque transmission member 62 and increase the rotational torque of the final drive 32 relative to the fourth torque transmission member 62.

The third planetary gearset 98 may be referred to as a reduction planetary gearset. The third planetary gearset 98 may have a third sun gear 100, a third planet gear 102 (typically a plurality of third planet gears 102), a third planet carrier 104, and a third ring gear 106. The third planet gear 102 is coupled to the third sun gear 100 and the third ring gear 106. More specifically, the third planet gear 102 is positioned radially between and is engaged with the third sun gear 100 and the third ring gear 106. The third planet carrier 104 is coupled to the third planet gear 102 and rotates relative to the third sun gear 100 as the third planet gear 102 orbits the third sun gear 100. The third ring gear 106 is coupled to the third planet gear 102 such that the third planet gear 102 is disposed radially between the third sun gear 100 and the third ring gear 106. The third sun gear 100 of the third planetary gearset 98 may be rotatably coupled to the fourth torque transmission member 62. The third planet carrier 104 may be rotatably coupled to the final drive 32.

In the embodiments with the third planetary gearset 98 rotatably coupled to the final drive 32, the total gear reduction between the first electric motor 20 and the set of wheels 14 of the electric vehicle 12, therefore, is equal to the first gear reduction R1, multiplied by the second gear reduction R2, multiplied by the third gear reduction R3, multiplied by the fifth gear reduction R5. Moreover, in the embodiments with the second electric motor 74, the second planetary gearset 84 rotatably coupled to the output shaft 28, and the third planetary gearset 98 rotatably coupled to the final drive 32, the total gear reduction between the second electric motor 74 and the set of wheels of the electric vehicle 12, therefore, is equal to the fourth gear reduction R4, multiplied by the third gear reduction R3, multiplied by the fifth gear reduction R5.

Moreover, although not required, the assembly 10 may include a second output shaft 108 rotatably coupled to the fourth torque transmission member 62 and to the final drive 32. In other words, the second output shaft 108 may rotatably couple the fourth torque transmission member 62 and the final drive 32. The second output shaft 108 may be hollow (i.e., not solid). More specifically, the second output shaft 108 may define a fifth bore 110. The first axle shaft 36 or the second axle shaft 38 may extend through the second output shaft 108. The first axle shaft 36 or the second axle shaft 38 may extend through the fifth bore 110 defined by the second output shaft 108.

Additionally, the third sun gear 100 may be hollow (i.e., not solid). More specifically, the third sun gear 100 may define a sixth bore 112. The first axle shaft 36 or the second axle shaft 38 may extend through the third sun gear 100. The first axle shaft 36 or the second axle shaft 38 may extend through the sixth bore 112 defined by the third sun gear 100.

The third planetary gearset 98 advantageously introduces the fifth torque reduction R5 through components co-axially aligned with the first axis A1, further utilizing packaging space in electric vehicles 12 that is typically underutilized. It is to be appreciated that, although the third planetary gearset 98 is shown only in FIGS. 6 and 12, the third planetary gearset 98 may be used in combination with all other embodiments disclosed herein, including, but not limited to, the embodiments shown in FIGS. 1-5 and 7-11.

As discussed above, in some embodiments, as shown in FIGS. 1-6, the assembly 10 includes the planetary gearset 30 rotatably coupled to the intermediate input shaft 26 and to the output shaft 28. However, in other embodiments, as shown in FIGS. 7-12, the assembly 10 includes a transfer shaft 114 rotatably coupled to the intermediate input shaft 26 and the output shaft 28. When present, the transfer shaft 114 extends along a third axis A3 different from the first axis A1 and the second axis A2. The transfer shaft 114 is configured to transmit rotational torque from the intermediate input shaft 26 to the output shaft 28.

In the embodiments shown in FIGS. 7-12, the intermediate input shaft 26 may include a first transfer gear 116. The transfer shaft 114 may include a second transfer gear 118 and a third transfer gear 120 spaced from the second transfer gear 118 along the third axis A3. The second transfer gear 118 of the transfer shaft 114 is configured to receive rotational torque from the first transfer gear 116 of the intermediate input shaft 26. The first transfer gear 116 and the second transfer gear 118 may introduce a sixth gear reduction R6 between the intermediate input shaft 26 and the transfer shaft 114.

The sixth gear reduction R6 may decrease the rotational speed of the transfer shaft 114 relative to the intermediate input shaft 26 and increase the rotational torque of the transfer shaft 114 relative to the intermediate input shaft 26. Dependent upon the design and configuration of the first and second transfer gears 116, 118, the sixth gear reduction R6 may be anywhere in a wide range of gear reductions. Moreover, because a distance the intermediate input shaft 26 and the transfer shaft 114 may remain static, the design and configuration of the first and second transfer gears 116, 118 may be altered to change the sixth gear reduction R6. In this way, the assembly 10 provides flexibility with regard to how much rotational torque is delivered from the intermediate input shaft 26 to the transfer shaft 114 without having to change the distance between the intermediate input shaft 26 and the transfer shaft 114.

Moreover, the output shaft 28 may include a fourth transfer gear 122 configured to receive rotational torque from the third transfer gear 120 of the transfer shaft 114. The third transfer gear 120 and the fourth transfer gear 122 may introduce a seventh gear reduction R7 between the transfer shaft 114 and the output shaft 28. The seventh gear reduction R7 may decrease the rotational speed of the output shaft 28 relative to the transfer shaft 114 and increase the rotational torque of the output shaft 28 relative to the transfer shaft 114. Dependent upon the design and configuration of the third and fourth transfer gears 120, 122, the seventh gear reduction R7 may be anywhere in a wide range of gear reductions. Moreover, because a distance the transfer shaft 114 and the output shaft 28 may remain static, the design and configuration of the third and fourth transfer gears 120, 122 may be altered to change the seventh gear reduction R7. In this way, the assembly 10 provides flexibility with regard to how much rotational torque is delivered from the transfer shaft 114 to the output shaft 28 without having to change the distance between the transfer shaft 114 and the output shaft 28.

The assembly 10 may further include a transfer clutch 124 operably coupled to the intermediate input shaft 26, the output shaft 28, and to at least one chosen from the first transfer gear 116 and the fourth transfer gear 122. In other words, beyond the intermediate input shaft 26 and the output shaft 28, the transfer clutch 124 may be coupled to the first transfer gear 116, the fourth transfer gear 122, or both the first transfer gear 116 and the fourth transfer gear 122. The transfer clutch 124 is moveable between a first position, a second position, and a third position.

When the transfer clutch 124 is in the first position, the intermediate input shaft 26 and the output shaft 28 are rotatably coupled directly through the transfer clutch 124. In the first position, rotational torque is transferred from the intermediate input shaft 26, through the transfer clutch 124, to the output shaft 28. It is to be appreciated that, in the first position, little to no rotational torque is transferred through the transfer shaft 114.

When the transfer clutch 124 is in the second position, the intermediate input shaft 26 and the output shaft 28 are rotatably coupled through the transfer shaft 114. In the second position, rotational torque is transferred from the intermediate input shaft 26, through the first transfer gear 116 to the second transfer gear 118 to rotatably couple the intermediate input shaft 26 to the transfer shaft 114, and then through the third transfer gear 120 to the fourth transfer gear 122, and then to the output shaft 28.

When the transfer clutch 124 is in the third position, the intermediate input shaft 26 and the output shaft 28 are completely rotatably decoupled from one another. Said differently, when the transfer clutch 124 is in the third position, rotational torque is unable to be transferred through the transfer clutch 124 or through the transfer shaft 114, thus rotatably decoupling the electric motor 20 from the set of wheels 14, 16 of the electric vehicle 12. Rotatably decoupling the electric motor 20 from the set of wheels 14, 16 of the electric vehicle 12 may be advantageous to reduce parasitic losses of the electric motor spinning when not in use.

Although not required, the assembly 10 may further include a plurality of rolling elements 126. The plurality of rolling elements 126 may be disposed between the output shaft 28 and the fourth transfer gear 122, as shown in FIGS. 7-12. In this embodiment, the plurality of rolling elements 126 allow the output shaft 28 and the fourth transfer gear 122 to rotate freely relative to one another when the transfer clutch 124 is in the first position or the third position, preventing rotational torque to be transferred from the transfer shaft 114 to the output shaft 28. However, when the transfer clutch 124 is in the second position, the output shaft 28 and the fourth transfer gear 122 are rotatably coupled together, thus allowing rotational torque to be transferred from the transfer shaft 114 to the output shaft 28.

Alternatively or additionally, although not shown, it is contemplated that the plurality of rolling elements 126 may be disposed between the intermediate input shaft 26 and the first transfer gear 116. In this embodiment, the plurality of rolling elements 126 allow the intermediate input shaft 26 and the first transfer gear 116 to rotate freely relative to one another when the transfer clutch 124 is in the first position or the third position, preventing rotational torque to be transferred from the intermediate input shaft 26 to the transfer shaft 114. However, when the transfer clutch 124 is in the second position, the intermediate input shaft 26 and the first transfer gear 116 are rotatably coupled together, thus allowing rotational torque to be transferred from the intermediate input shaft 26 to the transfer shaft 114. It is to be appreciated that the advantages of the planetary gearset 30 described above are also present in the embodiments with the transfer shaft 114.

The plurality of rolling elements 126 may be bearings, including, but not limited to, ball bearings and roller bearings, and/or plain bearings including, but not limited to, bushings and two-piece bearings (i.e., full bearings).

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An assembly for an electric vehicle including a first and second set of wheels, said assembly comprising;
    an input shaft extending along a first axis;
    an electric motor rotatably coupled to said input shaft, co-axially aligned with said first axis, and configured to provide rotational torque to said input shaft;
    an intermediate input shaft extending along a second axis different from said first axis, with said intermediate input shaft being rotatably coupled to said input shaft and configured to receive rotational torque from said input shaft;
    an output shaft extending along said second axis and spaced from said intermediate input shaft along said second axis;
    a planetary gearset rotatably coupled to said intermediate input shaft and said output shaft, with said planetary gearset co-axially aligned with said second axis and configured to transmit rotational torque from said intermediate input shaft to said output shaft; and
    a final drive co-axially aligned with said first axis and rotatably coupled to said output shaft for providing rotational torque to at least one of the first and second set of wheels of the electric vehicle;
    wherein said planetary gearset comprises a sun gear rotatably coupled to said intermediate input shaft, a planet gear coupled to said sun gear, a ring gear coupled to said planet gear such that said planet gear is disposed radially between said sun gear and said ring gear, and a planet carrier coupled to said planet gear and rotatably coupled to said output shaft.

2. The assembly as set forth in claim 1, wherein said first axis extends parallel to said second axis such that said input shaft extends parallel to both said intermediate input shaft and said output shaft.

3. The assembly as set forth in claim 1, wherein said output shaft is solid.

4. The assembly as set forth in claim 1 further comprising a first torque transmission member rotatably coupled to said input shaft and a second torque transmission member rotatably coupled to said intermediate shaft and configured to receive rotational torque from said first torque transmission member.

5. The assembly as set forth in claim 4, wherein said second torque transmission member is aligned with said first torque transmission member such that said first torque transmission member is disposed between said final drive and said electric motor with respect to said first axis.

6. The assembly as set forth in claim 4, wherein said first and second torque transmission members are further defined as first and second sprockets, and wherein said assembly further comprises a first flexible drive coupled to said first and second sprockets to transmit rotational torque from said input shaft to said intermediate input shaft.

7. The assembly as set forth in claim 1 further comprising a third torque transmission member rotatably coupled to said output shaft, and a fourth torque transmission member rotatably coupled to said final drive and configured to receive rotational torque from said third torque transmission member.

8. The assembly as set forth in claim 7, wherein said third torque transmission is integral with said output shaft.

9. The assembly as set forth in claim 7, wherein said third and fourth torque transmission members are further defined as third and fourth sprockets, and wherein said assembly further comprises a second flexible drive coupled to said third and fourth sprockets to transmit rotational torque from said output shaft to said final drive.

10. The assembly as set forth in claim 1 further comprising a first axle shaft extending from said final drive toward one wheel of one of the set of wheels, and a second axle shaft extending from said final drive toward the other wheel of one of the set of wheels, wherein said input shaft is hollow, and wherein one of said first and second axle shafts extends through said input shaft.

11. The assembly as set forth in claim 1, wherein said planetary gearset is a two-speed gearset configured to provide, between said intermediate input shaft and said output shaft, either a first gear ratio or a second gear ratio different from said first gear ratio.

12. The assembly as set forth in claim 1, wherein said intermediate input shaft is hollow, and wherein said output shaft is disposed at least partially within said intermediate input shaft.

13. The assembly as set forth in claim 1, wherein said electric motor is further defined as a first electric motor, and wherein said assembly further comprises a second electric motor co-axially aligned with said second axis and configured to provide rotational torque to at least one of said intermediate input shaft and said output shaft.

14. The assembly as set forth in claim 13, wherein said first electric motor is configured to provide a first rotational torque, with said first rotational torque being a maximum rotational torque said first electric motor is capable of producing,
wherein said second electric motor is configured to provide a second rotational torque, with said second rotational torque being a maximum rotational torque said second electric motor is capable of producing, and
wherein said second rotational torque is less than said first rotational torque.

15. The assembly as set forth in claim 13, wherein said second electric motor is rotatably coupled to said intermediate input shaft such that said second electric motor is configured to provide rotational torque to said intermediate input shaft.

16. The assembly as set forth in claim 13, wherein said second electric motor is rotatably coupled to said output shaft such that said second electric motor is configured to provide rotational torque to said output shaft.

17. The assembly as set forth in claim 16 further comprising a second input shaft rotatably coupled to said second electric motor and co-axially aligned with said second axis.

18. The assembly as set forth in claim 17, wherein said planetary gearset is further defined as a first planetary gearset, and wherein said assembly further comprises a second planetary gearset rotatably coupled to said output shaft and said second input shaft, with said second planetary gearset co-axially aligned with said second axis and configured to transmit rotational torque from said second input shaft to said output shaft.

19. The assembly as set forth in claim 1, wherein said planetary gearset is further defined as a first planetary gearset, and wherein said assembly further comprises a third planetary gearset rotatably coupled to said final drive, co-axially aligned with said first axis, and configured to transmit rotational torque to said final drive.

20. An assembly for an electric vehicle including a first and second set of wheels, said assembly comprising;
an input shaft extending along a first axis;
an electric motor rotatably coupled to said input shaft, co-axially aligned with said first axis, and configured to provide rotational torque to said input shaft;
an intermediate input shaft extending along a second axis different from said first axis, with said intermediate input shaft being rotatably coupled to said input shaft and configured to receive rotational torque from said input shaft;
an output shaft extending along said second axis and spaced from said intermediate input shaft along said second axis;
a transfer shaft rotatably coupled to said intermediate input shaft and said output shaft, with said transfer shaft extending along a third axis different from said first axis and said second axis, and with said transfer shaft configured to transmit rotational torque from said intermediate input shaft to said output shaft; and
a final drive co-axially aligned with said first axis and rotatably coupled to said output shaft for providing rotational torque to at least one of the first and second set of wheels of the electric vehicle.

21. The assembly as set forth in claim 20, wherein said intermediate input shaft comprises a first transfer gear, wherein said transfer shaft comprises a second transfer gear and a third transfer gear spaced from said second transfer gear along said third axis, with said second transfer gear configured to receive rotational torque from said first transfer gear of said intermediate input shaft, and wherein said output shaft comprises a fourth transfer gear configured to receive rotational torque from said third transfer gear of said transfer shaft.

* * * * *